United States Patent [19]

Allain et al.

[11] 4,319,322
[45] Mar. 9, 1982

[54] METHOD AND APPARATUS FOR CONVERTING VIRTUAL ADDRESSES TO REAL ADDRESSES

[75] Inventors: Jacques M. Allain, Pleumeur Bodou; Daniel Courtel, Louannec; Jean L. Joubert; Jean P. Vidonne, both of Paris, all of France

[73] Assignee: Le Material Telephonique, Boulogne-Billancourt, France

[21] Appl. No.: 57,437

[22] Filed: Jul. 13, 1979

[30] Foreign Application Priority Data

Jul. 19, 1978 [FR] France ............... 78 21403

[51] Int. Cl.³ ............................... G06F 9/36
[52] U.S. Cl. ............................... 364/200
[58] Field of Search ... 364/200 MS File, 900 MS File

[56] References Cited

U.S. PATENT DOCUMENTS

| B 452,138 | 3/1976 | Nagashima | 364/200 |
| 3,815,101 | 6/1974 | Boss et al. | 364/200 |
| 4,042,911 | 8/1977 | Bourke et al. | 364/200 |
| 4,068,303 | 1/1978 | Morita | 364/200 |
| 4,084,226 | 4/1978 | Anderson et al. | 364/200 |
| 4,086,629 | 4/1978 | Desyllas et al. | 364/200 |

OTHER PUBLICATIONS

Olbert, A. G., "Single Level Address Translation", IBM Tech. Disc. Bull., vol. 20, No. 1, Jun. 1977, pp. 108–109.

Primary Examiner—Gareth D. Shaw
Assistant Examiner—Thomas M. Heckler
Attorney, Agent, or Firm—Roland Plottel

[57] ABSTRACT

Method and apparatus for converting a virtual address contained in an instruction into a real memory access address, when the stored data are organized in functional sets, the latter being divided into segments. Conversion is performed by means of a functional set number register 12, a segment label table 7, a plurality of base registers 4, and a base register updating device. The invention is applicable to data processing systems.

5 Claims, 3 Drawing Figures

METHOD AND APPARATUS FOR CONVERTING VIRTUAL ADDRESSES TO REAL ADDRESSES

BACKGROUND OF THE INVENTION

(a) Field of the Invention

The present invention relates to methods and apparatus for converting virtual addresses to real addresses.

A virtual address is defined as an address which is contained in a program instruction and which needs modifying in order to gain access to data represented by a word in a central memory, while a real address allows direct access. A central memory is defined as the memory containing the data to which the central unit of a computer has direct access, as opposed to auxiliary memories.

The invention relates more particularly to methods and apparatus for converting virtual addresses to real addresses for a real-time data processing system in which the programs are divided into numbered functional sets, each functional set being divided into segments defined by as many labels.

The division of a program into segments, or segmentation, is a method for limiting central memory congestion by loading the central memory at any one time with only that segment needed for executing the program at that time.

(b) Discussion of the Prior Art

Conventional conversion devices use a functional set number register, a table of segment labels located in the data processing system central memory and so-called "base" registers, each capable of storing a segment label, all these registers taken together being capable of storing the labels of segments required by a functional set.

Segmentation makes it necessary to consult the segment label table prior to each central memory access operation, since the virtual address (the only address known by the programmer), simply indicates the displacement (or relative address) within the segment. In order to obtain the absolute address, it is necessary to add this displacement to the base address (or start address) of the segment, which is given by the segment label table. This base address, comprising a given binary number, is conventionally associated with an access code and data indicating the size of the segment in order to constitute a segment label. This is the operating system of the data processing system controlling the segment label table, i.e. the locations of segments in the central memory.

In addition, the grouping of segments into functional sets comprises consulting a functional set number register prior to each segment label table access operation, since it is preferable to use functional set change instructions for updating the functional set number register rather than indicating this number in all instructions of the same functional set. This increases the effective addressing capacity of the data processing system.

In the case of known multiprogramming data processing systems using segmentation and the division of programs into functional sets, a supervisory program is called for each functional set change in order to update the base registers.

A disadvantage of the program-controlled updating method is its relatively long execute time. The disadvantage of this method thus increases with the number of functional set changes, which is especially true for the data processing systems used in electronic telephone exchanges.

Also in the case of known systems, the supervisory program updates all the central unit base registers at each change of functional set. This method needlessly increases the supervisory program execute time, since in telephone switching applications, processing of all the segments of the same functional set, before changing the latter, is very infrequent.

SUMMARY OF THE INVENTION

The purpose of the present invention is to overcome the disadvantages described above. According to one aspect of the invention, the apparatus for converting virtual addresses to real addresses is configured such that base register updating is performed automatically and upon request by a base register updating circuit.

According to another aspect of the invention, the base register updating device includes means for storing a table indicating the validity, with respect to the current functional set, of the segments contained in the base registers, and a central memory access order circuit for ordering either normal instruction execution access or prior access to a segment label table followed by normal access, depending on whether the label of the segment defined in the current instruction is present or not present in the base registers.

The purposes and characteristics of the present invention appear more clearly from the following description of an illustrative example, the said description referring to the appended drawings, in which:

DETAILED DESCRIPTION

Figure 1:
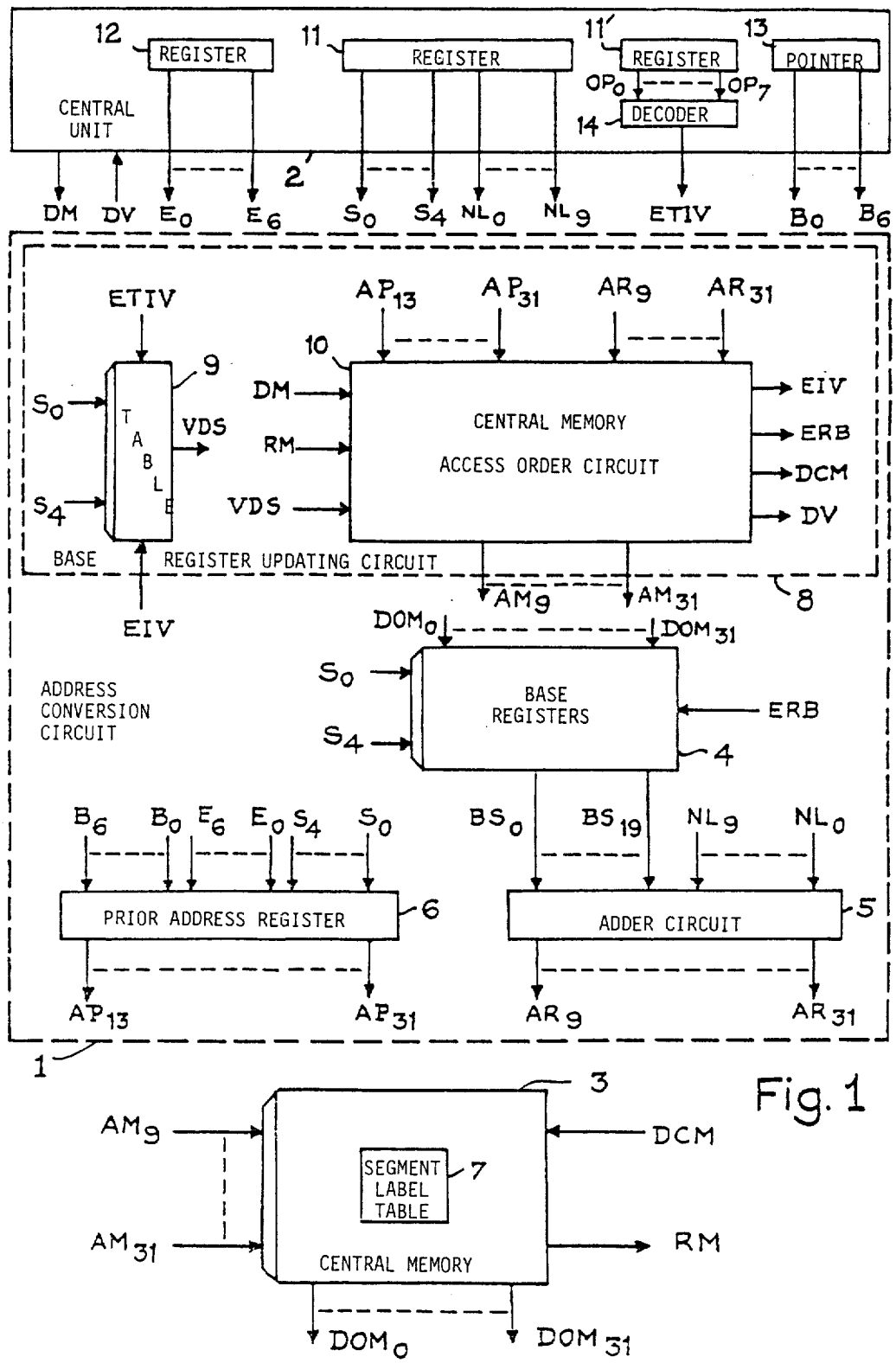
FIG. 1 is a block schematic diagram of an illustrative address conversion circuit according to the invention.

FIG. 1 shows the manner in which address conversion circuit 1 communicates with a central unit 2 and a central memory 3. The address conversion circuit 1 includes a plurality of base registers 4 which are capable of storing part of the segment labels of the current functional set, an adder 5 for establishing the real address, i.e. the central memory address for normal instruction execution access, and a register 6 for establishing the prior address, i.e. the central memory address for prior access to the segment label table 7 located in the central memory.

In accordance with the invention, the address conversion circuit 1 includes a base register updating device 8 which has itself a table 9 indicating the validity, with respect to the current functional set, of the segment labels contained in the base registers 4 and a central memory access order circuit 10, ordering either normal access or prior access to the segment label table followed by normal access, depending on whether or not the segment label defined in the current instruction is present in the base registers 4.

The virtual address is provided by a virtual address register 11 located in the central unit. This register contains the current segment number (bits $S_0$ to $S_4$), and the displacement within this segment (bits $NL_0$ to $NL_9$). The instruction operation code (bits $OP_0$ to $OP_7$) is provided by an instruction register 11 located in the central unit. The current functional set number (bits $E_0$ to $E_6$) is provided by a functional set number register 12 located in the central unit. The segment label table start address (bits $B_0$ to $B_6$) is provided by a stack pointer 13 located in the central unit.

The term "current" implies that all the operations performed from the instant of loading the instruction into the instruction register are being performed. Adder 5 establishes the real address (bits $AR_9$ to $AR_{31}$) from the segment label (bits $BS_0$ to $BS_{19}$) provided by the base registers 4 and the displacement in the segment (bits $NL_0$ to $NL_9$) provided by virtual address register 11. Register 6 establishes the prior address (bits $AP_{13}$ to $AP_{31}$) by juxtaposing the segment number, the functional set number and the segment label table start address. The central unit also includes a functional set change instruction decoding circuit 14, which is fed with the operation code.

The number of bits selected for encoding the various signals is only in the embodiment of the invention to be described illustrative of the invention. This number may be modified in any way without exceeding the scope of the invention.

The operation of the above circuit will now be described, considering the various types of instruction.

If the operation code of the instruction indicates that the latter is an instruction other than a functional set change instruction, the central unit sends a central memory access request signal DM to the central unit access order circuit 10. Order circuit 10 first checks if the current segment label is present in the base register by applying the current segment number to the input of the validity indicator table, which then feeds a segment label validity signal VDS to the order circuit 10.

If signal VDS indicates that the current segment label is present in the base registers, i.e. if this label is validated, normal access is ordered by applying the current segment number to the input of the base registers which then feed the label base value to adder 5. Order circuit 10, fed with the real and trial addresses, then selects the real address and sends a memory access trigger signal DCM to the central memory. Since the central memory address (bits $AM_9$ to $AM_{31}$) are those of the real address, the data read in the central memory (bits $DOM_0$ to $DOM_{31}$) can be acquired by the central unit. For this purpose, the memory answer signal RM fed by the central memory to the order circuit 10 is converted by the latter into a data validation signal DV for the central unit.

On the other hand, if signal VDS indicates that the current segment label is not present in the base registers, prior access to the segment label table is ordered. For this purpose, order circuit 10 selects the prior address and feeds a central memory access trigger signal DCM to the central memory. Since the central memory address is equal to the prior address, order circuit 10 inhibits transmission signal DV to the central unit and enables bits $DOM_0$ to $DOM_{31}$ to be written into the base registers by feeding the latter with a base register write order signal ERB. Order circuit 10 then sends a validity indicator table write order signal EIV to the validity indicator table for changing the status of the current segment label validity indicator. Real address access can then be ordered and the operation is executed, as described above.

If the operation code of the instruction indicates that the latter is a functional set change instruction, the operation code decoder changes the states of all the validity indicators in table 9 by means of a signal ETIV, and the contents of the functional set number register 12 are also changed.

In the example illustrated by FIG. 1, the segment number is encoded by means of 5 bits ($S_0$ to $S_4$). The maximum number n of segments per functional set is then 32.

Figure 2:
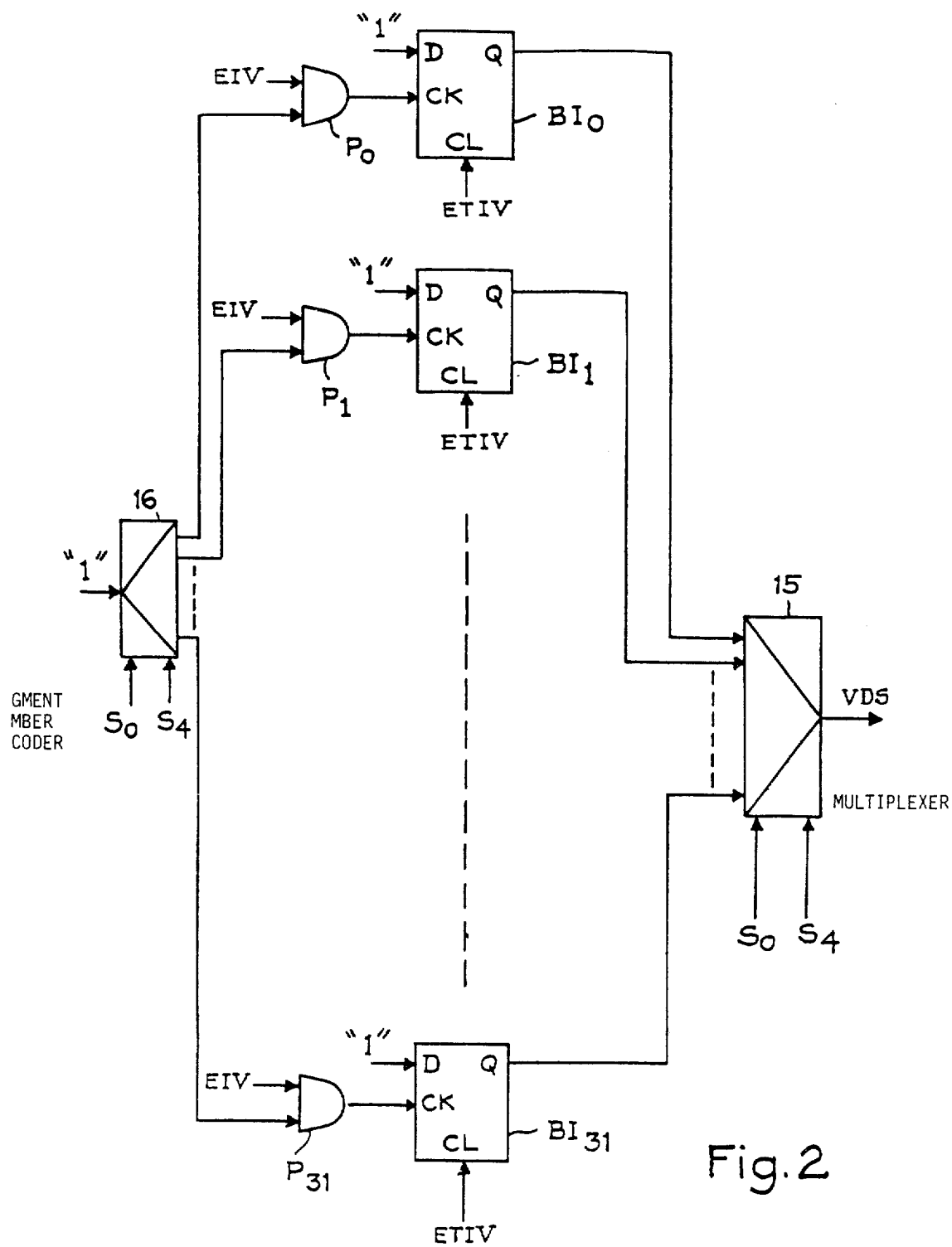
FIG. 2 is a more detailed circuit diagram of the validity indicator table used in FIG. 1.

Turning now to FIG. 2, the validity indicator table includes 32 type D indicating flip-flops $BI_0$ to $BI_{31}$. The validity indicator table read circuit comprises a read multiplexer 15 having 32 inputs connected to outputs Q of the indicating flip-flops, and controlled by the current segment number (bits $S_0$ to $S_4$). The output signal VDS of multiplexer 15 is equal to the signal available on the indicating flip-flop whose number coincides with the segment number, while The D inputs of the n indicating flip-flops are held in the logical "1" state. The indicating flip-flop write circuit comprises a coincidence circuit having 32 AND-gates $P_0$ to $P_{31}$, each having one input fed with the validity indicator table write order signal EIV, another input connected to one of the outputs of a segment number decoder 16, and an output connected to the clock input CK or a corresponding one of the indicating flip-flops. Decoder 16 has one input held in the logical "1" state and is controlled by bits $S_0$ to $S_4$. Input CL, for forcing the 32 indicating flip-flops to zero, is fed with signal ETIV obtained on the output of the functional set change instruction decoding circuit.

Following a central memory access request DM, order circuit 10 tests signal VDS. If signal VDS is a logical "1", this indicates that the current segment label is present in the base registers, allowing normal access. If signal VDS is a logical "0", order circuit 10 orders prior access to the segment label table and, when the label is loaded in the base registers, sends a logical "1" signal EIV to the validity indicator table. This signal EIV, in combination with decoder 16, then activates the indicating flip-flop whose number corresponds to the current segment number, thereby changing the Q output of this flip-flop to "1".

Figure 3:
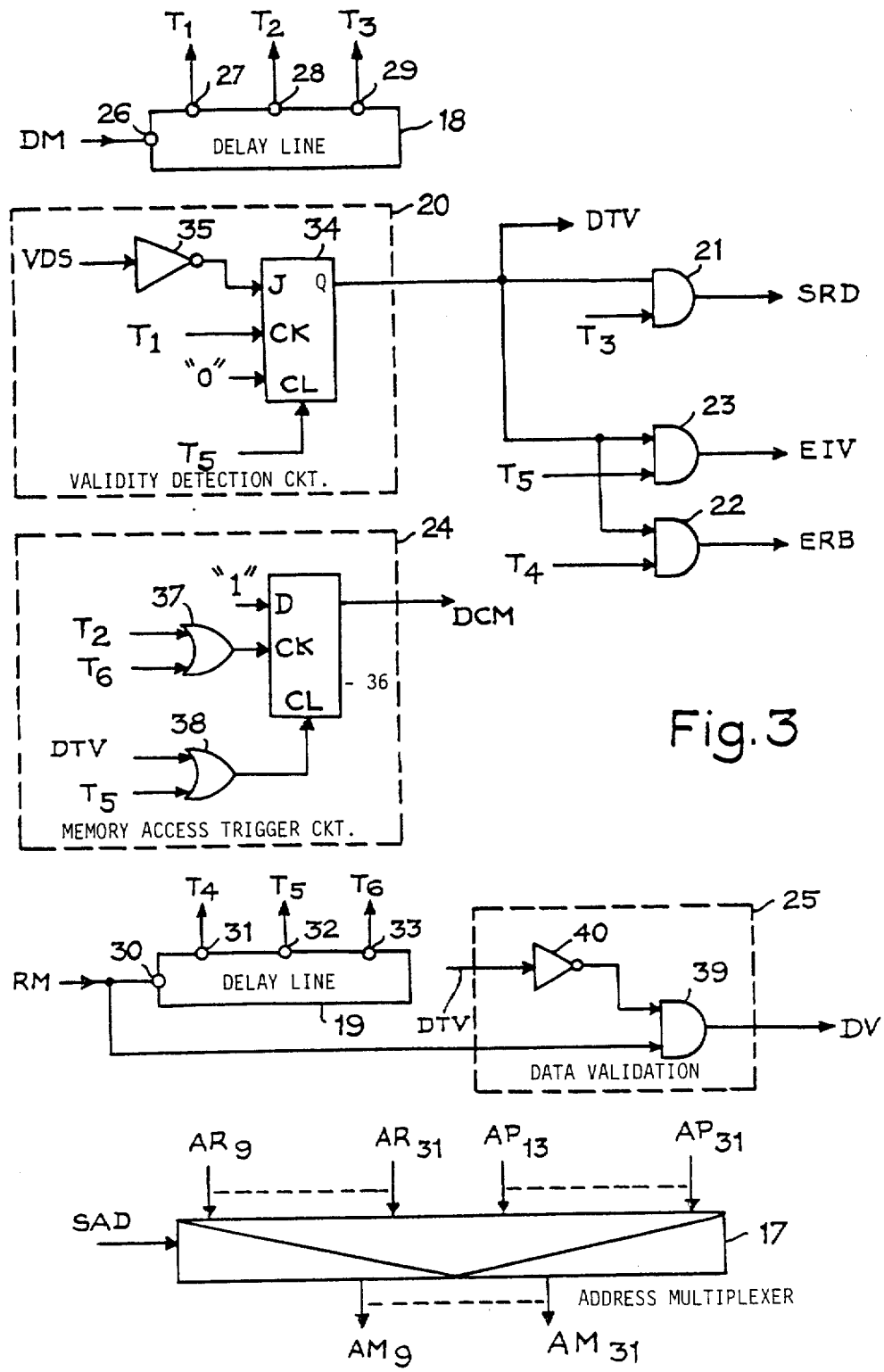
FIG. 3 is a more detailed circuit diagram of the central memory access order circuit used in FIG. 1.

Referring now to FIG. 3, it is seen that the central memory access order circuit 10 includes a central memory addressing multiplexer 17, a sequencer consisting of a first delay line 18 and a second delay line 19, a segment label validity detection circuit 20, a circuit 21 controlling multiplexer 17, a base register write order circuit 22, a validity indicator table write order circuit 23, a central memory access trigger circuit 24 and a circuit 25 validating data read in the central memory.

The first delay line 18 has an input 26 which comprises the first input terminal of the sequencer and which is fed with the central memory access request signal DM, an output 27 which comprises the first output terminal of the sequencer and which produces a first sequencer output signal $T_1$, an output 28 which comprises the second output terminal of the sequencer and which produces a second sequencer output signal $T_2$, and an output 29 which comprises the third output terminal of the sequencer and which produces a third sequencer output signal $T_3$.

The second delay circuit 19 has an input 30 which comprises the second input terminal of the sequencer and which is fed with the central memory acknowledge signal RM, an output 31 which comprises the fourth output terminal of the sequencer and which produces a fourth sequencer output signal $T_4$, an output 32 which comprises the fifth output terminal of the sequencer and which produces a fifth sequencer output signal $T_5$, an output 33 which comprises the sixth output terminal of the sequencer and which produces a sixth sequencer output signal $T_6$.

The validity detection circuit 20 includes a type JK validity detection flip-flop 34, whose input J is fed with signal VDS inverted by an inverter 35, whose input K is held in the logical "0" state, whose "0" forcing input CL is fed with the fifth sequencer output signal $T_5$, whose clock input CK is fed with the first sequencer output signal, and whose output Q produces the validity detection signal DTV.

The input signals of address multiplexer 17 comprise the real address (bits $AR_9$ to $AR_{31}$) produced by adder 5, and the prior address (bits $AP_{13}$ to $AP_{31}$) produced by register 6. When ordered by signal SAD produced by circuit 21, multiplexer 17 produces the central memory address (bits $AM_9$ to $AM_{31}$). The central memory addressing order circuit 21 comprises a first AND-gate fed with signal DTV and the third sequencer output signal $T_3$.

The base register write order circuit 22 comprises a second AND-gate fed with signal DTV and the fourth sequencer output signal $T_4$.

The validity indicator table write order circuit 23 comprises a third AND-gate fed with signal DTV and the fifth sequencer output signal $T_5$.

The central memory access triggering circuit 24 comprises a type D triggering flip-flop 36, whose input D is held in the logical "1" state, whose clock input CK is fed with the output signal of a first OR-gate 37 fed with the second and sixth sequencer output signals, whose "0" forcing input CL is fed with the output signal of a second OR-gate 38 fed with a signal DTV and the fifth sequencer output signal $T_5$, and whose output Q produces the central memory access triggering signal DCM.

Circuit 25 validating the data read in the central memory comprises a fourth AND-gate 39 fed with signal RM received on the second sequencer input terminal and signal DTV inverted by an inverter 40.

In reply to a first sequencer input pulse, i.e. to a central memory access request from the central unit, signals $T_1$, $T_2$ and $T_3$ present first, second and third sequencer output signals respectively delayed, with respect to each other and with respect to the first sequencer input pulse, by an interval determined by the first delay line 18. The first sequencer output pulse activates the validity detection flip-flop 34.

If the current segment label is not present in the base registers, i.e. if signal VDS is a logical "0", signal DTV then changes to a logical "1". The memory access triggering flip-flop 36 is activated on the second sequencer output pulse, triggering prior access to the segment label table with a prior address produced by multiplexer 17 on the third sequencer output pulse. Following prior access execution, the memory acknowledge signal RM presents a pulse which constitutes the second sequencer input pulse. Because signal DTV is a logical "1", validation circuit 25 inhibits transmission of signal DV to the central unit. In reply to this second input pulse, signals $T_4$, $T_5$ and $T_6$ present fourth, fifth and sixth sequencer output pulses respectively, delayed one with respect to the other and with respect to the second input pulse by an interval determined by the second delay line 19. Signal ERB is activated on the fourth sequencer output pulse and orders the label to be written into the base registers. Signal EIV is activated on the fifth sequencer output pulse and orders the change of the label validity indicator to a logical "1". At the same time, signal DTV changes back to a logical "0" on the fifth sequencer output pulse. The triggering flip-flop 36 is again activated on the sixth sequencer output pulse, which then triggers normal central memory access, with the real address produced by multiplexer 17. Following real access execution, signal RM presents a pulse. Because signal DTV is a logical "0", validation circuit 25 enables signal DV to be sent to the central unit.

If the current segment label is present in the base registers, i.e. if signal VDS is a logical "1", signal DTV remains a logical "0" on the first sequencer output pulse. The triggering flip-flop 36 is activated on the second sequencer output pulse, thereby triggering normal access with the real address produced by multiplexer 17. Because signal DTV is a logical "0" upon normal access execution, validation circuit 25 enables signal DV to be fed to the central unit.

It is thus seen that the base registers are automatically updated, i.e. without provision being made by the programmer, since the base register updating device consists entirely of wired logic. In addition, it is seen that this updating is performed upon request by means of the validity indicator table, i.e. as and when necessary, instead of being performed systematically, since the labels of segments not used within the same functional set are not loaded into the base registers. The data processing speed obtained by a base register updating device of this type is, thus, considerably higher than that obtained when using a supervisory programme.

Automatic and on-request updating can also be performed using the same principle by a microprogrammed automaton instead of a wired automaton.

Although the principles of the present invention are described above in relation with a practical example, it should be clearly understood that the said description is given as an example only and does not limit the scope of the present invention.

We claim:

1. Apparatus for converting virtual addresses into real addresses for use in real-time data processing systems, wherein programs are divided into functional sets, each of said functional sets being divided into segments having respective labels, said virtual address containing a segment number and a displacement within said segment, said data processing system comprising a central memory 3, said apparatus comprising a segment label table storage 7 which is located in said central memory, a plurality of base registers 4 which are able to store segment labels contained in said segment label table storage and relating to a current functional set, and an adder 5 which performs the addition of a current segment label given by said base registers addressed with said segment number contained in said virtual address, and of said displacement within said segment contained in said virtual address, said real address consisting in the result of the addition, the improvement comprising a base register updating circuit 8 which comprises: a validity indicator table means 9 for indicating the validity, with respect to said current functional set, of said segment labels contained in said base registers, said validity indicator of said table of validity indicators being in a first or in a second logic state depending upon whether or not said current segment label has already been loaded in said base registers, and a central memory access order circuit means 10 for ordering either normal instruction execution access, or a prior access to said segment label table storage in order to fetch said current segment label and to load it in said base registers, followed by normal access, depending on whether or not said validity indicator corresponding to said current label is in said first or said second logic state.

2. Apparatus in accordance with claim 1 wherein said system includes a central unit 2, comprising a functional set change instruction decoding circuit 14 and a segment number decoding circuit 16, and wherein said validity indicator table means 9 comprises n D type indicating flip-flops ($BI_{o-n}$) where n equals the maximum number of segments per functional set, each indicating flip-flop having a forcing input connected to the output of said functional set change instruction decoding circuit 14, a D input held in the logical "1" state, a read circuit comprising an n-input read multiplexer 15 connected to the Q outputs of said indicating flip-flops and controlled by said segment number decoding circuit, and a write circuit comprising a plurality of ($P_0$-$P_{31}$) circuits detecting coincidence between a validity indicator table write order signal produced by said central memory access order circuit means 10 and the output signal of said segment number decoding circuit 16.

3. Apparatus in accordance with claim 1 wherein said apparatus includes a prior address register 6 for establishing a prior address of the central memory address for prior access to the segment label table 7; and wherein said central memory access order circuit 10 comprises a central memory addressing multiplexer 17 having input signals $AR_9$-$AR_{31}$ from said adder 5 and $AP_{13}$-$AP_{31}$ from said prior address register 6, and providing a central memory address $Am_9$-$Am_{31}$ output signal; sequencer means for producing a train of pulses in reply to a central memory access request from said central unit and to a central memory acknowledge signal for the central unit, a segment label validity detection circuit 20, a central memory addressing multiplexer control circuit 21, a base register write order circuit 22, a validity indicator table write order circuit 23, a central memory access triggering circuit and a circuit 25 validating the data read in the central memory, said circuits being all activated by said sequencer and controlled by said validity detection circuit.

4. Apparatus in accordance with claim 3, wherein said sequencer comprises a first delay line 19 for producing on first, second and third sequencer output terminals respectively first, second and third sequencer output pulses, said pulses being delayed with respect to each other, and with respect to a first sequencer input pulse received on a first sequencer input terminal, said first sequencer input consisting of said central memory access request from said data processing central unit, a second delay line 18 for producing on fourth, fifth and sixth sequencer output terminals respectively fourth, fifth and sixth sequencer output pulses delayed, with respect to each other, and with respect to a second sequencer input pulse received on a second sequencer input terminal, said second sequencer input pulse consisting of said central memory acknowledge signal for the central unit.

5. Apparatus in accordance with claim 1 wherein said central unit includes a functional set and change instruction decoding circuit 14 and a segment number decoding circuit 16, wherein said validity indicator table 9 comprises n D type indicating flip-flops ($BI_{o-n}$) where n equals the maximum number of segments per functional set, each indicating flip-flop having a forcing input connected to the output of said functional set change instruction decoding circuit 14, a D input held in the logical "1" state, a read circuit comprising an n-input read multiplexer 15 connected to the Q outputs of said indicating flip-flops and controlled by said current segment number, and a write circuit comprising a plurality of ($P_0$-$P_{31}$) circuits detecting coincidence between a validity indicator table write order signal produced by said central memory access order circuit and the output signal of said segment number decoding circuit 16, wherein said central memory access order circuit 10 comprises a central memory addressing multiplexer 17 whose input signals are produced by said adder 5 and by a prior address forming circuit 6, whose output signal is the central memory address $Am_9$-$Am_{31}$, a sequencer means for producing a given train of pulses in reply to a central memory access request from said central unit and to a central memory acknowledge signal for the central unit, a segment label validity detection circuit 20, a central memory addressing multiplexer control circuit 21, a base register write order circuit 22, a validity indicator table write order circuit 23, a central memory access triggering circuit and a circuit 25 validating the data read in the central memory, latter circuits being all activated by said sequencer and controlled by said validity detection circuit, apparatus wherein said sequencer comprises a first delay line 19 for producing on first, second and third sequencer output terminals respectively first, second and third sequencer output pulses, said pulses being delayed with respect to each other, and with respect to a first sequencer input pulse received on a first sequencer input terminal, said first sequencer input pulse consisting in said central memory access request from said data processing central unit, a second delay line 18 for producing on fourth, fifth and sixth sequencer output terminals respectively fourth, fifth and sixth sequencer output pulses delayed, with respect to each other, and with respect to a second sequencer input pulse received on a second sequencer input terminal, said second sequencer input pulse consisting in said central memory acknowledge signal for the central unit, wherein said segment label validity detection circuit 20 comprises a JK type detection flip-flop 34 activated by said first sequencer output pulse and having its J input connected to the output of said validity indicator table read multiplexer 15 via an inverter 35, its K input held in the logical "0" state, and its "0" forcing input connected to said fifth output terminal of said sequencer, wherein said central memory addressing multiplexer control circuit comprises a first AND-gate 21 fed with the signal obtained on the Q output of said detection flip-flop 34 and with the signal obtained on said third sequencer output terminal, wherein said base register write order circuit comprises a second AND-gate 22 fed with the signal obtained on the Q output of said detection flip-flop 34 and with the signal obtained on said fourth sequencer output terminal, wherein said validity indicator table write order circuit comprises a third AND-gate 23 fed with the signal obtained on the Q output of said detection flip-flop 34 and with the signal obtained on said fifth sequencer output terminal, wherein said central memory access triggering circuit comprises a D type triggering flip-flop 36, activated by the output signal of a first OR-gate 37 fed with the signals obtained on said second and sixth sequencer output terminals, whose D input is held in the logical "1" state and whose "0" forcing input is connected to the output of a second OR-gate 38 fed with the signal obtained on the Q output of said detection flip-flop 34 and the signal obtained on said fifth sequencer output terminal, and wherein said circuit validating the data read in the central memory comprises a fourth AND-gate 39 fed with the signal obtained on said second sequencer input terminal and the signal obtained on output $\overline{Q}$ of said detection flip-flop.

* * * * *